United States Patent [19]

Wolf et al.

[11] 4,317,871

[45] Mar. 2, 1982

[54] BATTERY SIDE TERMINAL ASSEMBLY

[75] Inventors: Alby H. Wolf, Minneapolis; Richard T. Strait, St. Paul, both of Minn.

[73] Assignee: Gould Inc., Rolling Meadows, Ill.

[21] Appl. No.: 134,026

[22] Filed: Mar. 26, 1980

[51] Int. Cl.³ .............................................. H01M 2/30
[52] U.S. Cl. .................................... 429/179; 429/185
[58] Field of Search ............... 429/179, 160, 161, 185; 339/94 A, 94 R, 60 R, 116 R, 201, 218 R, 263 B

[56] References Cited

U.S. PATENT DOCUMENTS

| | | | |
|---|---|---|---|
| 3,303,056 | 2/1967 | Sabatino et al. | 429/179 |
| 3,764,393 | 10/1973 | Fujimoto | 429/160 |
| 3,767,467 | 10/1973 | Miller et al. | 429/179 |
| 3,775,730 | 11/1973 | Rowls et al. | 339/116 R |
| 3,821,029 | 6/1974 | Smith | 429/179 X |
| 3,843,411 | 10/1974 | Orlando et al. | 29/623.1 |
| 4,100,674 | 7/1978 | Tiegel | 429/179 X |

FOREIGN PATENT DOCUMENTS

| | | |
|---|---|---|
| 48-81043 | 10/1973 | Japan . |
| 465956 | 5/1937 | United Kingdom . |
| 564077 | 9/1944 | United Kingdom . |
| 1114914 | 5/1968 | United Kingdom . |
| 1411126 | 10/1975 | United Kingdom . |
| 1547089 | 6/1979 | United Kingdom . |

*Primary Examiner*—Anthony Skapars
*Attorney, Agent, or Firm*—Augustus J. Hipp

[57] ABSTRACT

A battery side terminal assembly which includes a metal terminal insert keyed into the external portion of the battery side wall with a body portion which passes through an aperture in the side wall to the inner area of the battery container. The terminal insert is held in close contact with the battery side wall by a plastic ring which is force fit onto the body portion of the terminal insert. Subsequently a side terminal strap is resistance welded to the body portion of the insert to create a tightly sealed assembly. The plastic ring advantageously cooperates with the body portion of the insert and the strap to retain molten lead during the resistance welding operation.

8 Claims, 4 Drawing Figures

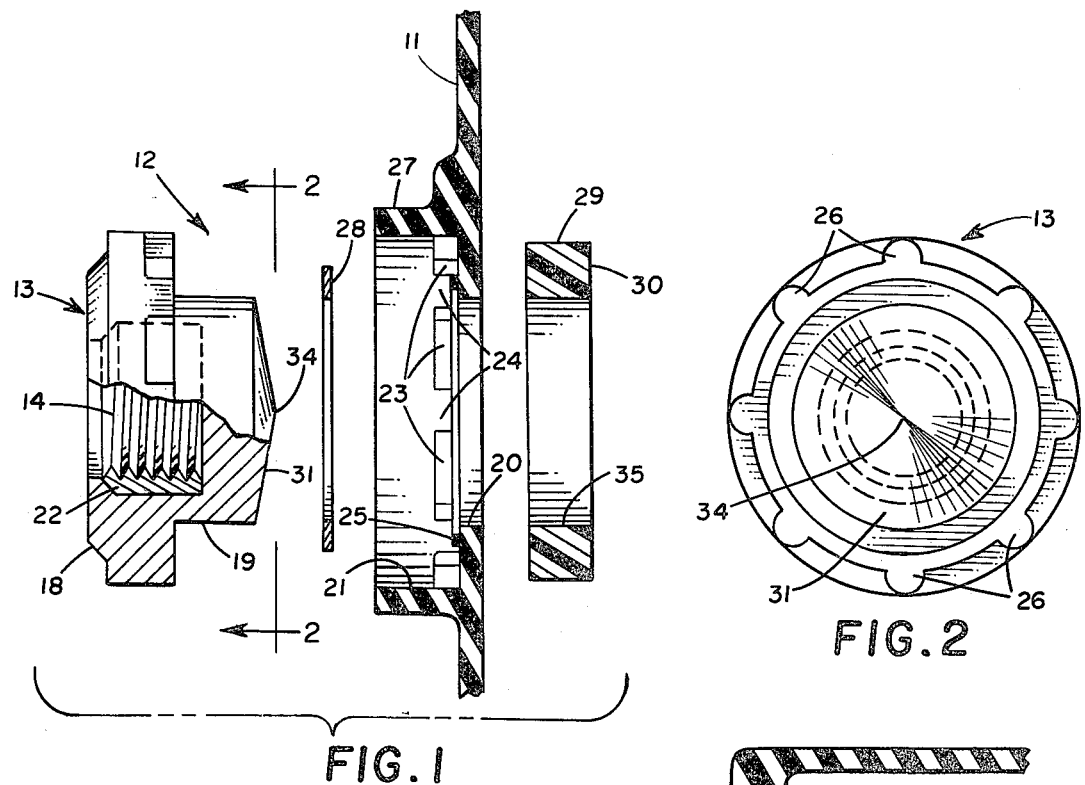
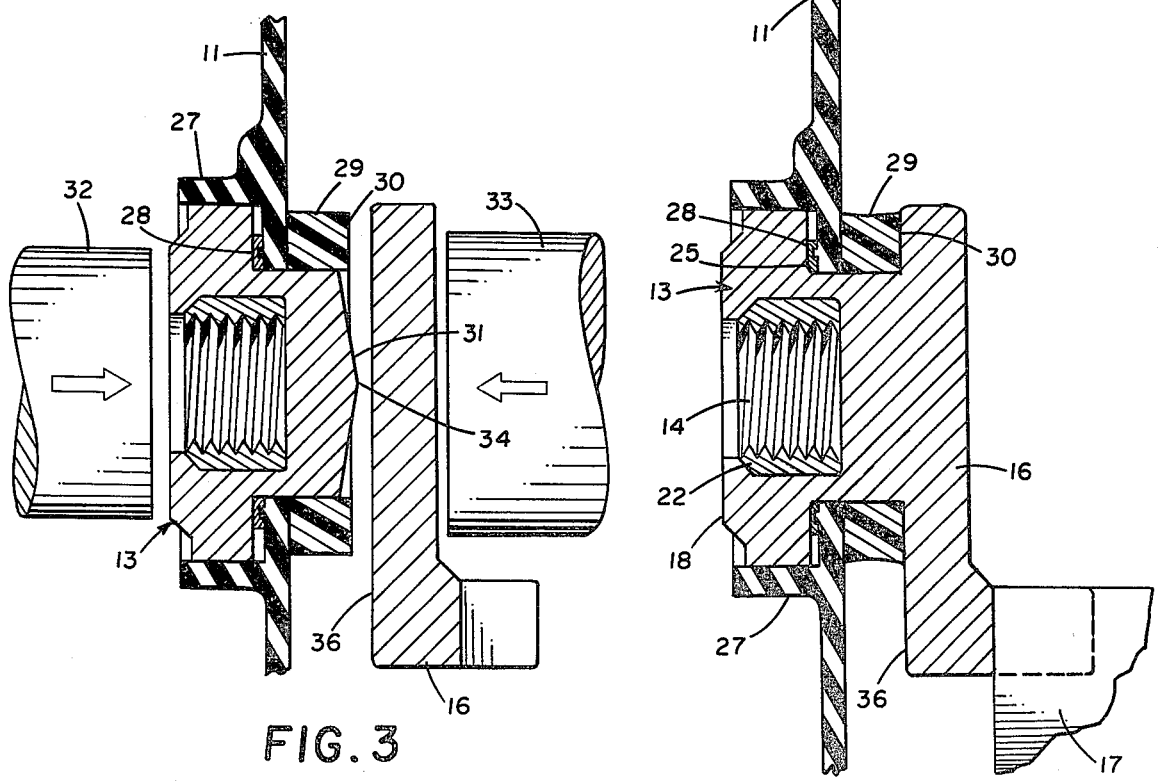

BATTERY SIDE TERMINAL ASSEMBLY

DESCRIPTION OF THE INVENTION

This invention relates generally to electric storage batteries and more particularly concerns a side terminal assembly for such batteries.

Presently, some battery side terminals include a lead terminal insert molded into the plastic side wall of the battery container. In another design, a lead terminal insert having a molded-in stainless steel nut includes a body portion which extends through an opening in the battery side wall into the battery container, with a secondary lead ring being heat fused to the body portion. In each of these constructions the molding or heat fusion serves to provide an electrolyte seal for the terminal insert prior to a subsequent attachment of a terminal strap to the insert. In these battery side terminal constructions, in a final stage of assembly, the side terminal strap, which is coupled to the battery plates, is then welded to the terminal insert to complete the terminal assembly structure.

In order to automate the assembly of a battery side terminal, and to improve the reliability of the electrical connection between the side terminal strap lug and the terminal insert, the use of a resistance welding technique is advantageous. It is particularly advantageous to produce a side terminal assembly which, while not requiring the molding of a side terminal insert into the container wall, has a side terminal insert retained adjacent the battery side wall for attaching the insert to a side terminal strap using a resistance welding technique.

It is therefore an object of the present invention to provide a battery side terminal assembly, wherein a terminal element is inserted and held rather than molded in the battery side wall, in which a single step resistance welding operation is utilized to simultaneously accomplish electrolyte sealing and strap welding.

It is a further object of the present invention to provide such a side terminal arrangement in which a side terminal element which is inserted through the side wall of the battery is reliably positioned for a subsequent resistance welding operation.

Other objects and advantages of the invention will become apparent upon reading the following detailed description and upon reference to the drawings, in which:

FIG. 1 is an exploded side view partially in section of a battery side terminal structure, excluding the lug for the side terminal strap;

FIG. 2 is an end view of the side terminal body element taken in the direction of the arrows 2—2 in FIG. 1;

FIG. 3 is a side view partially in section of the side terminal assembly and a pair of resistance welding electrode elements prior to the resistance welding of the terminal assembly: and FIG. 4 is a view similar to that of FIG. 3 after the resistance welding operation, with the electrodes removed.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

With initial reference to FIGS. 1 and 2, portions of a battery side terminal assembly 12 in accordance with the present invention are shown in an exploded view, in relationship to a side wall 11 of a battery. Typically, two such terminals are provided at opposite ends of one long side wall of the battery. The side wall 11 is of a relatively thin molded material suitable for a battery container.

The battery terminal assembly 12 includes a metal terminal insert 13, preferably of a lead material, having internal threads 14 and, upon assembly, being electrically connected by a side terminal strap 16 (FIGS. 3 and 4) to a plate structure 17 inside the battery container.

The insert 13 comprises a head portion 18 which remains on the outside of the side wall 11 and a body portion 19 fitted within an opening 20 in the side wall. The internal threads 14 are defined by a nut member 22 embedded in the head portion 18 of the insert 13, with the member 22 being formed of harder metal than the relatively soft lead of the insert. A plurality of ribs 23 are molded integrally with the side wall 11 to define, between the ribs 23, locking notches 24. A corresponding plurality of lugs 26 are formed about the periphery of the head portion 18 of the insert to fit within the notches 24. Surrounding the head portion 18, to define an opening 21, a continuous barrier ring 27 is molded integrally with the battery side wall 11 to project outwardly, and the ribs 23 are also molded integrally with the barrier ring so as to serve to stiffen the ring. When assembled, the terminal insert head portion 18 is recessed within and shielded by the barrier ring 27, while the lugs 26 and the notches 24 interfit to lock the insert 13 against rotation.

To prevent electrolyte leakage, the ribs 23 define a recess in which a thin annular gasket 28 is fitted against an annular sealing lip 25 so that the gasket is sandwiched tightly against the lip 25 by the insert head portion 18 to provide a fluid tight seal around the opening 21. As thus far described, the terminal assembly 12 is substantially similar to that described in commonly assigned U.S. Pat. No. 3,767,467.

In accordance with the invention, and to insure that the insert 13 is in intimate contact with the side wall 11 of the battery container for a subsequent resistance welding operation, a ring 29 of an electrically nonconducting material, such as plastic, is forced onto the body portion 19 of the insert extending inwardly through the opening 21. The ring 29 has an inside diameter slightly less than the outside diameter of the body portion 19, and the body portion is slightly tapered, so that, upon being pushed fully onto the body portion, the ring holds the insert 13 tightly for a subsequent welding operation.

In order to complete the side terminal assembly, after the insert 13 is held in place in the wall 11 by the ring 29, the side terminal strap 16 is resistance welded to the inwardly facing surface 31 of the body portion 19 of the insert. To accomplish this, a pair of resistance welding electrode pads 32, 33 are moved into position as shown in FIG. 3 on either side of the terminal assembly components, and the electrode pads are mechanically driven together with the element 32 engaging the head portion of the insert 13 and the electrode 33 engaging the inner surface of the strap 16. The inwardly facing surface 31 of the insert body portion 19 is conical, tapering to a central point 34. As the electrode pads 32, 33 move together, the outwardly facing surface 36 of the lug 16 first engages the point 34 on the conical surface 31 of the insert 13. An electrical potential is supplied between the electrodes 32, 33 by a power supply operable to deliver high welding currents, and the tip 34 of the cone on the conical surface 31 is first melted. As the lug 16 is driven into engagement with the ring 29, the surface 36 of the lug 16 is welded to the surface 31 of the insert 13, as shown in FIG. 4. Subsequently, the electrical current ceases and, after a cooling period, the electrodes are mechanically removed from the battery container.

An amount of lead in the conical surface 31 extends beyond the plane defined by the inner surface 30 of the ring 29. In addition, there is a volume of empty space within the ring 29 so that, during the resistance welding operation, the molten lead from the outwardly extending portion of the conical surface 31 is advantageously retained by the ring 29 as it cools.

Further with regard to providing a lead reservoir for the molten lead from the resistance welding operation, modifications may be made to the ring 29 such as, for example, to form the ring so that it includes a lead-receiving groove on its interior face 35. As a further modification, the ring 29 may be formed such that an O ring placed on the body portion 19 of the insert is held against the wall 11 by a chamfered edge on the ring 29 so that, upon assembly, there is a seal created between the ring 29 and the inner surface of the container wall 11. Should a satisfactory electrolyte seal be created in such a fashion, the gasket 28 could be eliminated.

As a further alternative, the ring 29 may be constructed of a flexible, resilient rubber or rubber-like material in order to itself provide an electrolyte seal. In this case, the plane of the inner surface of the ring would generally lie inwardly of the tip 34 of the conical surface 31. The outwardly-facing surface 36 of the strap 16 would first engage the resilient ring during the resistance welding operation, compressing the ring and subsequently contacting the conical surface 31. As before, molten lead is advantageously retained within the ring.

It may be seen that a battery side terminal assembly has been described wherein a terminal element is inserted and held rather than molded in a battery side wall and wherein a single step resistance welding operation may be utilized to accomplish welding and an electrolyte seal. It may further be seen that such a battery side terminal assembly has been described in which a side terminal element which is inserted through the side wall of the battery container is reliably positioned for a resistance welding operation.

What is claimed is:

1. In a battery having a relatively thin wall, a side terminal assembly passing through the wall comprising a metal terminal insert having a head portion outside the wall and having a body portion extending inside the wall through an aperture in the wall, and an electrically nonconductive apertured element surrounding the body portion of the metal terminal insert inside the wall.

2. The side terminal assembly of claim 1 in which the body portion of the terminal insert has a generally circular cross section and the nonconductive element is a nonconductive ring.

3. The side terminal assembly of claim 2 which further comprises a continuous barrier ring molded integrally with said battery wall to project outwardly therefrom and surrounding the opening through the wall.

4. The side terminal assembly of claim 3 in which the head portion of the terminal insert extends radially outwardly beyond the body portion and the aperture in the wall to define an annular shoulder on the outside of the wall, and further comprising a thin annular gasket held in sealing engagement between said annular shoulder and the wall.

5. In a battery having a relatively thin wall, a side terminal assembly passing through the wall comprising a metal terminal insert having a head portion outside the wall and having a body portion extending inside the wall through an aperture in the wall, an electrically nonconductive apertured element surrounding the body portion of the metal terminal insert inside the wall, and a metal strap, coupled to plates inside the battery, welded to the body portion of the metal terminal insert.

6. The side terminal assembly of claim 5 in which the body portion of the terminal insert has a generally circular cross section and the nonconductive element is a nonconductive ring.

7. The side terminal assembly of claim 6 which further comprises a continuous barrier ring molded integrally with said wall to project outwardly therefrom and surrounding the opening through the wall.

8. The side terminal assembly of claim 7 in which the head portion of the terminal insert extends radially outwardly beyond the body portion and the aperture in the wall to define an annular shoulder on the outside of the wall, and further comprising a thin annular gasket held in sealing engagement between said annular shoulder and the wall.

* * * * *